(12) United States Patent
Thompson et al.

(10) Patent No.: US 8,829,805 B2
(45) Date of Patent: Sep. 9, 2014

(54) VARIABLE LOAD CIRCUITS FOR USE WITH LIGHTING CONTROL DEVICES

(75) Inventors: Stephen Thompson, London (GB); Graham Booth, Leighton Buzzard (GB); Clive Lopez, Whitehall, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 214 days.

(21) Appl. No.: 13/369,646

(22) Filed: Feb. 9, 2012

(65) Prior Publication Data

US 2012/0139431 A1    Jun. 7, 2012

Related U.S. Application Data

(63) Continuation of application No. 12/438,587, filed as application No. PCT/GB2007/003320 on Sep. 4, 2007, now Pat. No. 8,169,154.

(30) Foreign Application Priority Data

Sep. 4, 2006   (GB) .................................. 0617393.4

(51) Int. Cl.
    *G05F 1/00*    (2006.01)
(52) U.S. Cl.
    USPC .......................................................... 315/291
(58) Field of Classification Search
    USPC .......................................................... 315/291
    See application file for complete search history.

(56) References Cited

U.S. PATENT DOCUMENTS 6,127,784 A    10/2000   Grossman et al.
7,872,427 B2 *  1/2011   Scianna ........................ 315/291

FOREIGN PATENT DOCUMENTS

WO          99/45750        9/1999
WO        2005/115058      12/2005
WO     WO 2005115058 A1 * 12/2005

OTHER PUBLICATIONS

International Search Report fo PCT/GB2007/003 320, mailed Dec. 4, 2007.
International Preliminary Report on Patentability for PCT/GB2007/003320, mailed Dec. 4, 2007.

* cited by examiner

*Primary Examiner* — Thienvu Tran
(74) *Attorney, Agent, or Firm* — Ostrolenk Faber LLP

(57) ABSTRACT

A variable load circuit (2) is provided for use with a dimmer (1). A low wattage load such as a LED (3) is provided in series with the dimmer and the variable load circuit is provided in parallel with the LED. The variable load circuit has two different load characteristics: when the applied voltage from the dimmer is below a threshold, the variable load circuit presents a fixed load (24), and when the applied voltage is above a threshold the variable load circuit presents a variable load so as to act as a constant current sink. The variable load is provided by a secondary load portion (25) which may or may not act in combination with the fixed load (24), and the secondary load portion (25) is switched in or out of the variable load circuit by a trigger circuit portion (26).

19 Claims, 6 Drawing Sheets

| Component | 120 Volt | 240 Volt |
|---|---|---|
| R3 | 2 MOhm | 2 MOhm |
| R4 | 392 kOhm | 220 kOhm |
| R11 | 100 kOhm | 100 kOhm |
| R12 | 100 kOhm | 100 kOhm |
| R13 | 100 kOhm | 100 kOhm |
| R27 | 330 Ohm | 1 kOhm |
| R29 | 16 Ohm | 73 Ohm |
| R31 | 22 kOhm | 51.1 kOhm |
| R32 | 1 kOhm | 1 kOhm |
| R33 | 1 kOhm | 1 kOhm |
| C3 | 47 pFarad | 4.7 nFarad |
| C4 | 0.047 Microfarad | 0.1 Microfarad |
| C6 | 0.044 Microfarad | 0.044 Microfarad |
| Z1 | 6.8 Volts | 5.6 Volts |
| Z2 | 6.8 Volts | 5.6 Volts |

VARIABLE LOAD CIRCUITS FOR USE WITH LIGHTING CONTROL DEVICES

CROSS REFERENCE TO RELATED APPLICATIONS

The present application is a continuation under 37 C.F.R. §1.53(b) of prior application Ser. No. 12/438,587 filed Aug. 5, 2009, by Stephen Thompson et al. entitled VARIABLE LOAD CIRCUITS FOR USE WITH LIGHTING CONTROL DEVICES which is a U.S. national phase application of International Application No. PCT/GB2007/003320 filed Sep. 4, 2007 which designated the U.S. and claims priority to Great Britain Application No. 0617393.4, filed Sep. 4, 2006 the entire disclosures of which are hereby incorporated by reference herein.

The present invention relates to variable load circuits for use with lighting control devices, and lighting control apparatus.

An example of a conventional lighting control device is a two wire analogue dimmer switch. Such dimmer switches typically take a signal from a power supply, a so called hot signal, and output a reduced signal, a so called dimmed hot signal. In order to reduce the power delivered by the dimmed hot signal, the dimmer typically truncates a portion of an input hot signal, which has a sine wave form. This process is shown schematically in FIG. 1. As may be seen from FIG. 1, the input sine wave may have the front portion of each half cycle of the input sine wave truncated. In this case, the dimmed hot signal is referred to as a forward phase or leading edge signal. Alternatively, the end portion of each half cycle of the input wave may be truncated. Such a dimmed hot signal is referred to as a trailing edge or reverse phase signal.

Truncation of the hot signal may be achieved by various circuits. hi one type of dimmer circuit, control circuitry controls a triac, a three terminal device with a control gate and two current carrying terminals, which is switched on and off during each half cycle of the hot signal to produce a truncated signal. The triac is switched on by applying a pulse to its control gate. Once switched on, the triac conducts until current through its current carrying terminals drops below a certain threshold value. This occurs at the end of the half cycle. The current/voltage characteristics that cause the triac to switch on and off are shown in FIG. 2. Looking at FIG. 2, it can be seen that there is a current at which the triac current/voltage characteristics sharply change. This current is known as the minimum holding current IH. hi alternative dimmer switch circuits, a Field Effect Transistor (FET) is used instead of a triac.

Once the hot signal has been dimmed, it may be placed across a load, typically a light bulb or similar lighting component. However, problems occur when one tries to use dimmer switches with low wattage loads such as Light Emitting Diodes (LEDs).

The control circuitry of a dimmer switch tends to be arranged to charge during the truncated part of the dimmed hot signal half cycle, i.e. at the beginning of each half cycle for a forward phase dimmer or at the end of each half cycle for a reverse phase dimmer. However, when a dimmer is used with a low wattage load, the current flowing in the dimmer during the relevant part of the signal cycle tends not to be high enough to allow effective charging.

Further, as mentioned above, a triac needs to pass a minimum current IH to continue to stay in the "on" state after the gate has been triggered. However, when the dimmer switch is placed in series with a low wattage load, the dimmer switch may not pass sufficient current to allow the triac to properly truncate the hot signal. A conventional solution to these problems is to place a further fixed load, perhaps a resistor, in parallel with the low wattage load. However, whilst a load may be selected to allow sufficient current to flow through the dimmer switch to allow the triac to work and the dimmer control circuitry to charge, this increases the power dissipated by the circuit and is wasteful.

It is an object of the present invention to alleviate some of the above problems.

According to an aspect of the present invention there is provided a variable load circuit for use with a lighting control device, which variable load circuit is arranged to operate with two different load characteristics during a half cycle of an applied alternating signal, wherein the variable load circuit is arranged to allow greater current to flow in response to voltage applied during a first portion of the half cycle of the applied alternating signal than in response to voltage applied during a second portion of the applied alternating signal, and wherein the variable load circuit is arranged to act as a constant current sink during the second portion of the applied alternating signal.

According to another aspect of the present invention there is provided a variable load circuit for use with a lighting control device, which variable load circuit is arranged to operate with two different load characteristics during a half cycle of an applied alternating signal, wherein the variable load circuit comprises means responsive to the applied alternating signal arranged to allow current flow in response to voltage applied during one portion of the half cycle of the applied alternating signal, and to allow the variable load circuit to act as a constant current sink during another portion of the half cycle.

When such a variable load circuit is connected to a triac based dimmer switch of the type described in the introduction, the dimmer switch may charge during the first part of the half cycle of the applied signal and the minimum holding current may be maintained during the second part of the half cycle of the applied signal. The use of a variable load circuit embodying the present invention is preferable to a fixed load circuit because less power is dissipated.

By providing a variable load portion with means responsive to an applied alternating signal, the variable load circuit is able to operate independently of any external load, such as a light, which may be connected to the variable load portion. Thus, the variable load portion may operate even if an external load is faulty, and regardless of whether such an external load is connected at all.

The said one portion, or first portion, of the applied alternating signal may include part of the half cycle of the alternating signal in which the magnitude of the applied voltage rises from zero. In such embodiments charging of dimmer circuitry may occur during the early part of the half cycle before the triac begins conducting. Such variable load circuits tend to work with forward phase dimmer switches that can take advantage of the higher current passed by the variable load circuit during the first portion of the applied signal to charge. In other embodiments the first portion of the applied signal may occur during a latter part of the half cycle, as the magnitude of the applied signal falls to zero. Such variable load circuits generally work with reverse phase dimmer switches that can take advantage of the higher current passed by the variable load circuit during the latter part of each half cycle to charge.

In some embodiments, during the said one portion, or first portion, of each half cycle of an applied alternating signal the variable load circuit acts as a constant current sink. This arrangement will conveniently allow a dimmer switch to charge when the variable load circuit acts as a current sink.

Preferably during the said one portion, or first portion, of the applied alternating signal the variable load circuit acts as a substantially fixed resistive load. By presenting a predominantly resistive load to the applied signal the current passing through the variable load circuit may be varied smoothly. Such embodiments tend to experience fewer difficulties when operated with dimmer switches than the embodiments that pass constant current during the first portion of the half cycle. This is because some dimmer switches have large Radio Frequency Interference (RFI) noise suppression inductors that can cause the control circuitry to be disrupted by large oscillations of current or voltage generated by sudden changes in current flow that are not sufficiently damped. A constant current sink has high dynamic impedance, dZ, that does not sufficiently damp these oscillations. A resistive load on the other hand has a lower fixed dynamic impedance that is equal to its resistance. A resistive load is consequently better at damping oscillations.

In further embodiments, the variable load circuit may be arranged to present different load characteristics to an applied alternating signal during first and third portions of a half cycle of the applied alternating signal than during a second portion of the half cycle of the applied alternating signal. Preferably the first and third portions of the half cycle of the applied signal are at the beginning and end of the half cycle respectively, as the magnitude of the applied signal rises from and falls towards zero. Preferably, the second portion of the half cycle of the applied alternating signal occurs during a middle portion of the half cycle of the applied signal. Such embodiments are advantageous in that they can be used with either forward phase dimmer switches or reverse phase dimmer switches.

Preferably during the first and third portions of the applied alternating signal the variable load circuit acts as a substantially fixed resistive load. In some embodiments the variable load circuit comprises a fixed load circuit portion, which includes at least one resistor arranged to act as a substantially fixed load.

Preferably the variable load circuit comprises a secondary load circuit portion that operates during part of the applied alternating signal. The secondary load circuit portion may include a first switch such as a transistor arranged to switch the secondary load circuit in and out of the variable load circuit. The transistor may have input and output contacts that are connected to the secondary load circuit portion. The variable load circuit may be arranged so that when the secondary load circuit portion is switched into the variable load circuit, the fixed load circuit portion and secondary load circuit portion together act as a constant current sink. Alternatively, the secondary load circuit portion may be arranged to act as a constant current sink.

Preferably a trigger circuit portion is arranged to switch the secondary load circuit in or out of the variable load circuit. In this way, the current flow in the variable load circuit may be controlled, hi particular, the trigger circuit portion may be arranged to provide current or voltage to a trigger terminal of the first transistor when a voltage the absolute value of which is greater than a threshold value is applied to the variable load circuit. The trigger circuit portion may comprise a zener diode arranged to breakdown at a predetermined threshold voltage so as to supply current to the common terminal of the first transistor.

The fixed load circuit may comprise a transistor such as a FET. The secondary load circuit portion may comprise a second transistor such as a Bipolar Junction transistor (BJT) along with a third transistor such as a FET. The third transistor may be the same transistor as the transistor in the fixed load circuit portion. The second and third transistors may be arranged to form a constant current sink when the first transistor allows current to pass through the secondary circuit portion. Of course, any equivalent switching means could be used instead of transistors.

In embodiments where the transistor in the fixed load circuit portion and the third transistor are a single FET, the variable load circuit may comprise a charge storage circuit portion to keep the FET on during part of the half cycle of the applied alternating signal when relatively little or no voltage is applied to the variable load circuit. The charge storage circuit portion may comprise capacitors, and in some embodiments a diode, arranged to store charge during a portion of the half cycle of the applied signal in which a voltage is applied to the variable load circuit and for maintaining voltage at the gate contact of the FET during a portion of the half cycle when relatively little or no voltage is applied to the variable load circuit.

In some embodiments, a voltage limiting means is provided between the gate contact of the FET and the source contact of the FET. The voltage limiting means may comprise a second zener diode. The second zener diode places an upper limit on the voltage difference that may exist between the gate contact and source contact (Vgs). This "clamping" of the Vgs helps to keep the response time of the FET at the end of each half cycle of the applied alternating signal consistent when used with different lighting control devices.

Preferably the variable load circuit comprises a rectifier for rectifying an AC input to the variable load circuit. Thus, while portions of the variable load circuit may operate with a rectified voltage, any externally connected components, such as a light, may be powered by an AC voltage, such as a forward phase dimmed hot signal.

Preferably the variable load circuit comprises no more than two terminals for external connections. Where there are two terminals these may be a hot input terminal and a neutral terminal.

The absolute value of the voltage of the applied alternating signal may be below a threshold during said one portion of the half cycle, and the absolute value of said voltage may be above a threshold during said another portion of the half cycle. In this way, two different load characteristics may be presented by the variable load circuit, depending on whether the absolute value of the applied voltage is above or below a predetermined threshold.

According to another aspect of the present invention there is provided a lighting control apparatus comprising a lighting control device and a variable load circuit, wherein the lighting control device is connected to the variable load circuit and is arranged to supply an alternating signal to the variable load circuit, and the variable load circuit is arranged to operate with two different load characteristics during a half cycle of the applied alternating signal, wherein the variable load circuit is arranged to permit greater current to flow in response to voltage applied during a first portion of the half cycle of the applied alternating signal than in response to voltage applied during a second portion of the applied operating signal, and wherein the variable load circuit is arranged to act as a constant current sink during the second portion of the applied operating signal.

According to yet another aspect of the present invention there is provided a lighting control apparatus comprising a lighting control device and a variable load circuit, wherein the lighting control device is connected to the variable load circuit and is arranged to supply an alternating signal to the variable load circuit, and the variable load circuit is arranged to operate with two different load characteristics during a half cycle of the applied alternating signal, wherein the variable load circuit is comprises means responsive to the applied alternating signal arranged to permit current to flow in response to voltage applied during one portion of the half cycle of the applied alternating signal, and to allow the variable load circuit to act as a constant current sink during another portion of the half cycle.

In many cases, the lighting control device will be arranged to require a minimum current to pass for correct operation. In such cases the circuit will be arranged to pass at least the minimum current during the second portion of the half cycle of the applied alternating signal. Further, the lighting control device may be arranged to charge during the first portion of the half cycle. In such embodiments, the variable load circuit may be arranged to pass sufficient current during the first portion of the half cycle to allow the lighting control device to charge.

Preferably the lighting control apparatus is arranged such that the lighting control device is arranged in series with the variable load circuit, and the variable load circuit is arranged in parallel with a light, when said light is connected to the apparatus.

The variable load circuit may optionally include any one or combination of the features described above with respect to the first aspect of the present invention. A variable load circuit embodying the present invention will now be described, by way of example only, with reference to the accompanying drawings in which.

Figure 1:
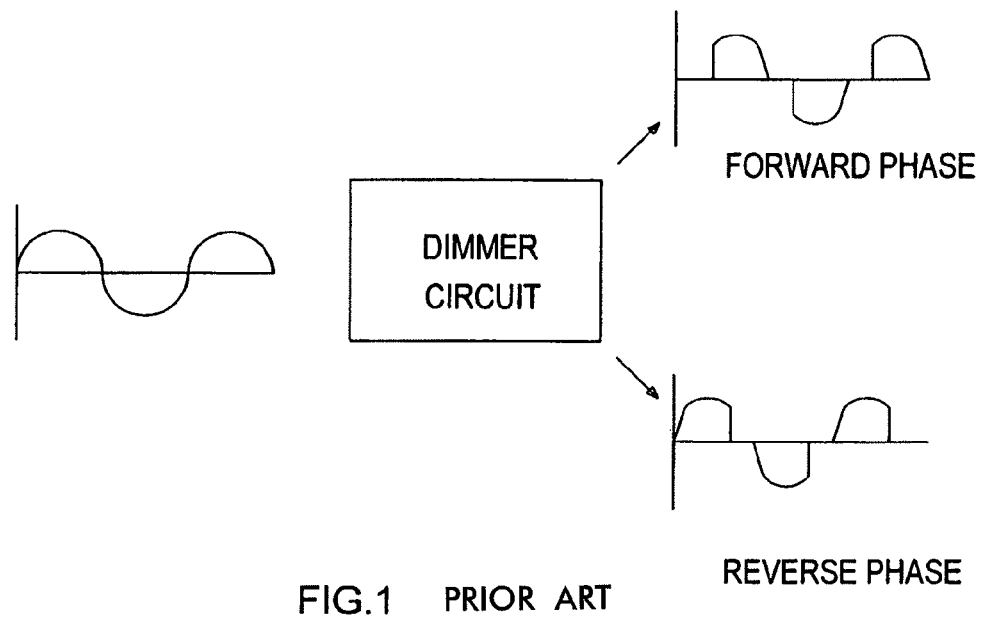
FIG. 1 shows truncation of an AC signal by a dimmer circuit.
Figure 2:
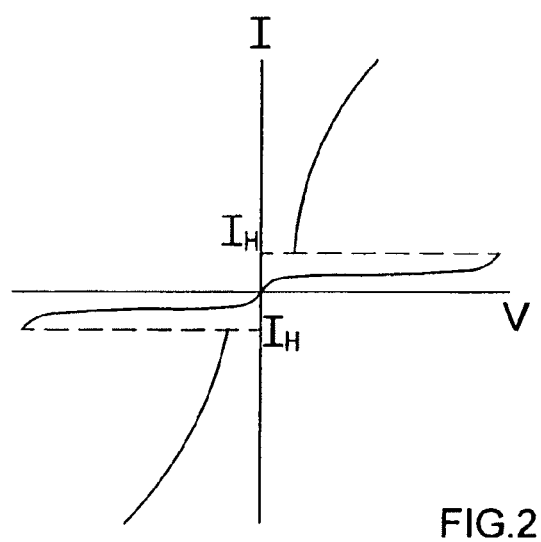
FIG. 2 shows voltage/current characteristics of a triac.
Figure 3:
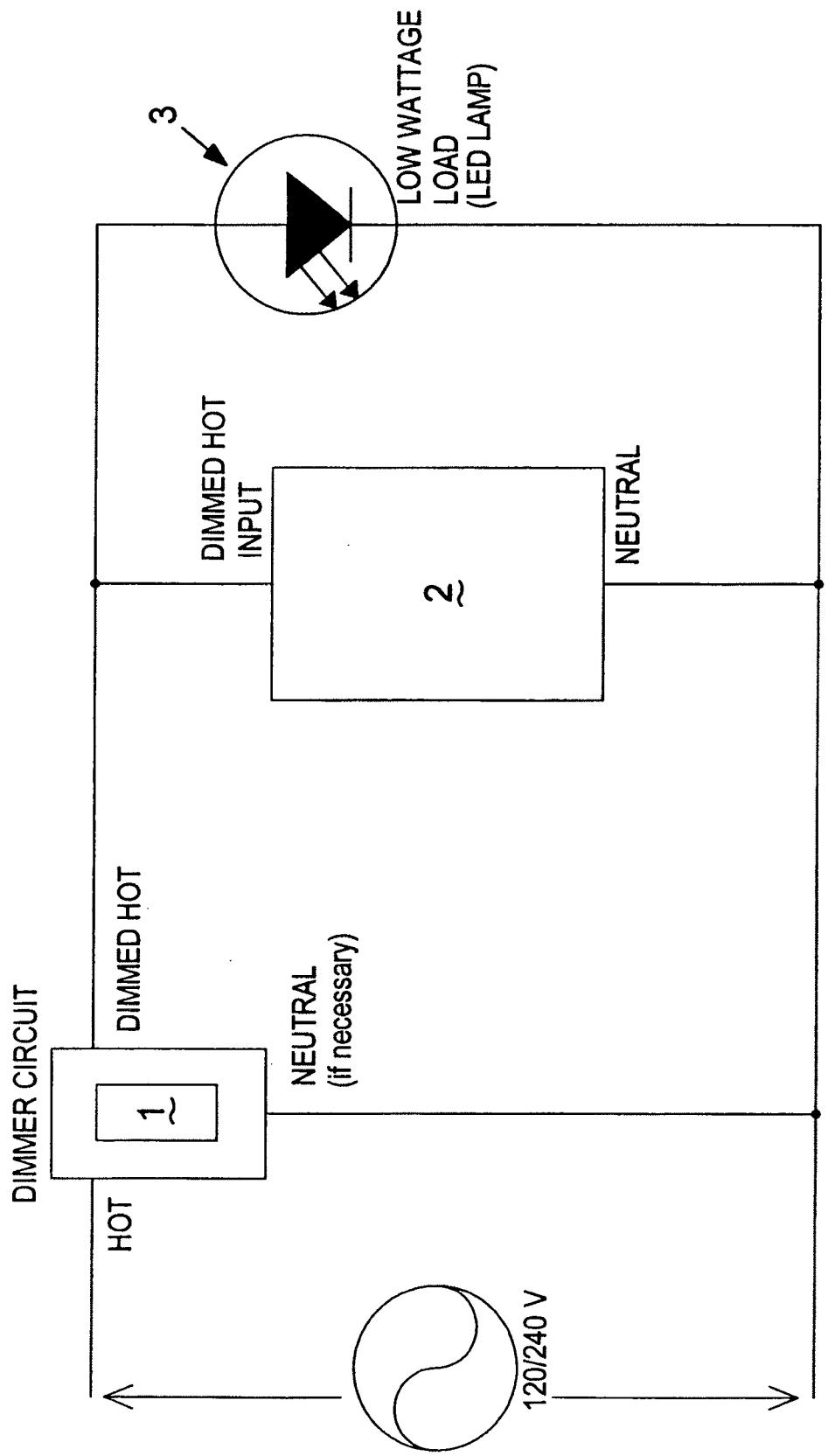
FIG. 3 is a circuit diagram showing an arrangement of a dimmer circuit, a variable load circuit and a low wattage load.

FIG. 3 shows a typical arrangement of a forward phase dimmer 1 and variable load circuit 2, which embodies the present invention. An AC power supply is provided as an input to the dimmer 1. The dimmer 1 converts the hot signal received from the power supply into a forward phase dimmed hot signal using a triac as discussed in the introduction. The dimmer 1 shown is a two wire dimmer circuit. In other embodiments, a reverse phase dimmer circuit or a three wire dimmer circuit may be used.

The variable load circuit 2 is provided in series with the dimmer 1 and in parallel with a low wattage load in the form of an LED lamp 3.

Figure 4:
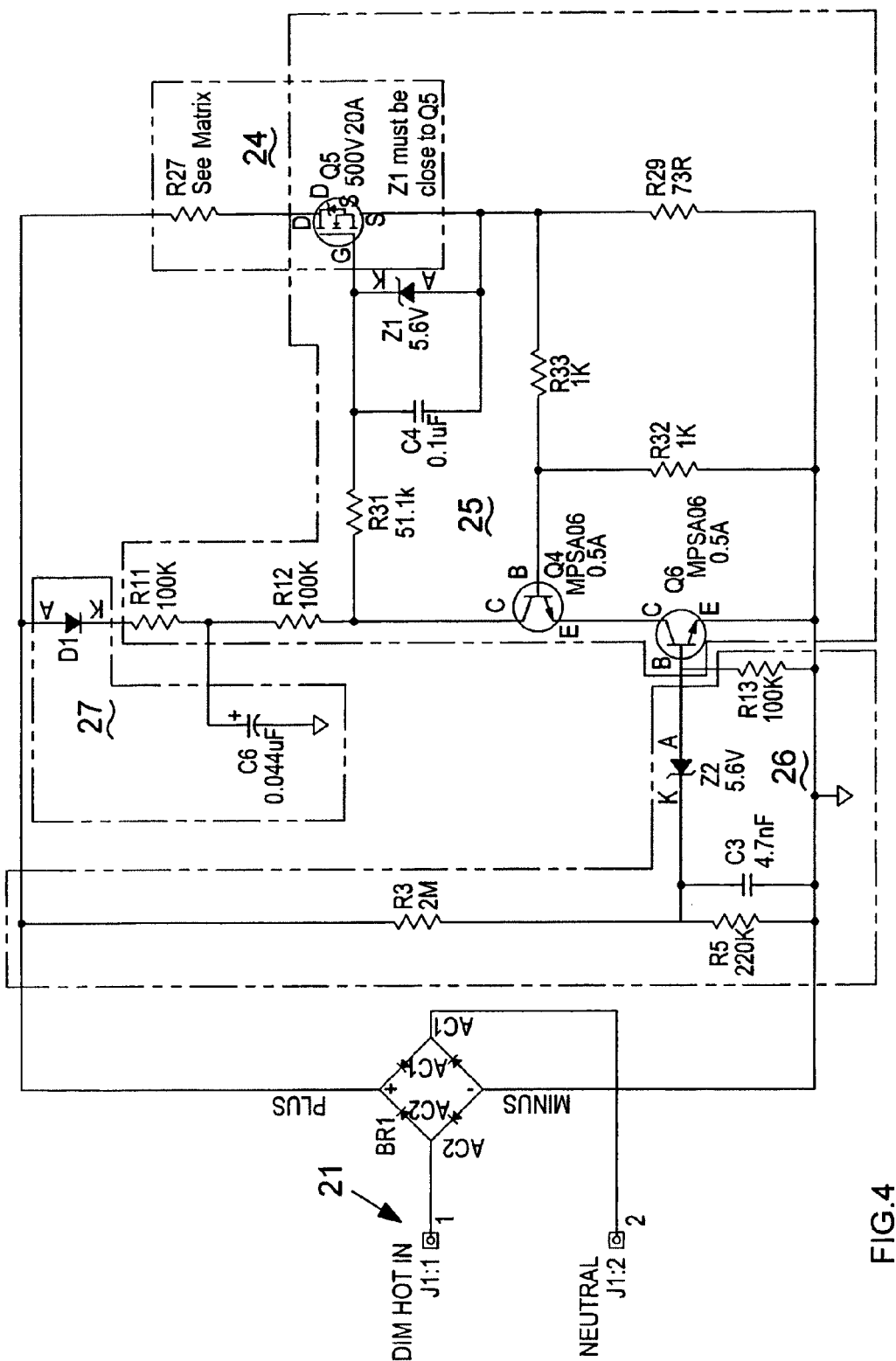
FIG. 4 is a circuit diagram of a variable load circuit that embodies the present invention.

FIG. 4 shows the layout of the variable load circuit 2. On the left hand side of the circuit diagram is the input 21 of the variable load circuit 2 to which the dimmed hot signal from the dimmer circuit 1 is applied. The described embodiment is designed to receive a 240V input signal.

A bridge rectifier BR1 is provided in series with the input 21.

The remainder of the circuit is formed of a fixed load circuit portion 24, a secondary load circuit portion 25, a trigger circuit portion 26, and a charge storage circuit portion 27.

The fixed load circuit portion 24 is connected between plus and common outputs of the bridge rectifier 23 via a resistor R29 of the secondary load circuit portion 25. The fixed load circuit portion 24 includes a 1 kOhm resistor, R27, in series with a FET, Q5. This portion of the circuit provides a fixed load when the FET Q5 is fully on, which is largely due to the resistance of resistor R27.

The secondary load circuit portion 25 includes the resistor R29 mentioned above and a branch connected in parallel with the fixed load circuit portion 24 and resistor R29. The branch includes a second transistor in the form of bipolar junction transistor, Q4, and a first transistor in the form of a bipolar junction transistor, Q6. Each of the transistors Q4, Q6 is connected by their common and emitter contacts to the branch of the secondary load circuit portion 25. The FET Q5 also forms part of the secondary load circuit portion 25 in common with the fixed load circuit portion 24.

The base contact of the transistor Q6 is connected to the trigger circuit portion 26. The base contact of the transistor Q4 is connected to source terminal of the FET, Q5 and above resistor R29. A gate terminal of FET Q5 is connected to the branch of the secondary load circuit portion 25 above second transistor Q4.

The trigger circuit portion 26 includes two resistors, R3 and R5, which form a voltage divider. The first resistor R3 in the arrangement shown in FIG. 4 is a 2 MegaOhm resistor. The second resistor R5 is a 220 kOhm resistor. The trigger circuit portion 26 is connected to the base terminal of transistor Q6 above the second resistor R5 via a zener diode Z2. Zener diode Z2 is arranged to prevent current flow towards the base terminal of transistor Q6 of the secondary load circuit portion 25 and has a breakdown voltage of 5.6V. A 4.7 nfarad capacitor C3 is provided between the input side of the zener diode Z2 and circuit common. The charge storage circuit portion 27 comprises a 0.044 microfarad polarised capacitor C6 connected between the secondary load circuit portion 25 above the transistor Q4 and circuit common, and a diode D1. The diode D1 is arranged between the secondary load circuit portion 25 and the plus output of bridge rectifier BR1. The diode D1 is arranged to prevent current from charge storage circuit portion 27 from flowing towards the plus output of the bridge rectifier BR1.

Between the gate of the FET Q5 and the source of FET Q5 is provided a FET clamping arrangement including a capacitor C4 and a zener diode Z1 is provided in parallel across the gate and source terminals of the FET Q5.

In use, a 240V forward phase dimmed hot signal is applied to the input of variable load circuit 2. The signal is rectified by bridge rectifier BR1. During the initial part of the cycle, when the applied voltage is low and rising from Zero, behaviour of the variable load circuit 2 is largely determined by the fixed load circuit portion 24. As will be explained later, initially the FET Q5 is fully on and the fixed load circuit portion 24 therefore appears to the applied signal as a fixed load.

During this initial part of the half cycle of the applied signal, transistor Q6 in the secondary load circuit portion 25 is open preventing current flow in the branch of the secondary load circuit portion 25. Relatively little current flows in the trigger circuit portion 26 because the resistance of resistors R3, R5 is significantly greater than the resistance of R27 in the fixed load circuit portion 24. The load characteristic of the variable load circuit 2 is therefore determined by the fixed load characteristic of the fixed load circuit portion 24 during this part of the half cycle.

As the voltage of the applied signal increases, the voltage across zener diode Z2 in the trigger circuit portion 26 increases. The increase of voltage across the zener diode Z2 is slowed by the charging of capacitor C3. When the voltage reaches 5.6 volts the Zener diode Z2 breaks down and current flows to the base contact of transistor Q6. When current flows from base to emitter contacts of transistor Q6, transistor Q6 allows current to flow in the branch of the secondary load circuit portion 25. The load characteristic of the variable load circuit 2 changes when the Zener diode Z2 breaks down. The transition between load characteristics is made more gradual by capacitor C4 and resistor R31. The break down of the zener diode Z2 occurs when the input voltage applied to the variable load circuit 2 is approximately 90V.

When current can flow through the branch of the secondary load circuit portion 25, behaviour of the variable load circuit 2 is determined by FET Q5 and transistor Q4. Current flow through the variable load circuit 2 is controlled by transistor Q4 and FET Q5 and depends on the current flowing from the fixed load circuit 24 below FET Q5 into resistor R29. This current generates a voltage and causes current to flow into the base terminal of transistor Q4, turning Q4 on. As Q4 starts to turn on, it draws charge away from the gate contact of FET Q5 and starts to turn Q5 off. As Q5 starts to turn off, current flow through resistor R29 is reduced. This arrangement forms a self regulating mechanism and causes the secondary load circuit portion 25 to act as a constant current sink.

As the half cycle of the applied signal comes to an end and the magnitude of the applied voltage falls towards zero, the voltage across Zener diode Z2 in the trigger circuit portion 26 falls. Current no longer reaches the base contact of transistor Q6 when the voltage across zener diode Z2 drops below 5.6V. With no current flowing through transistor Q6, the branch of the secondary load circuit portion 25 no longer passes current and the variable load circuit 2 reverts to behaving as a fixed load circuit.

The charge storage circuit portion 27 is provided to keep the FET Q5 fully on when the magnitude of the applied voltage is low. Voltage to the gate contact of the FET Q5 is maintained by discharging capacitor C6. Diode D1 keeps this charge from leaking out of the device through the Bridge BR1.

The FET clamping arrangement includes Zener diode Z1 which will breakdown at around 5.6V. The presence of Zener diode Z1 effectively clamps the voltage difference between the gate and source terminals, Vgs, of the FET Q5. This is important as otherwise use of different dimmers would create different Vgs when transistor Q6 is open, affecting the response of the variable load circuit 2 to changing voltage and varying the power dissipation.

Figures 5, 6:
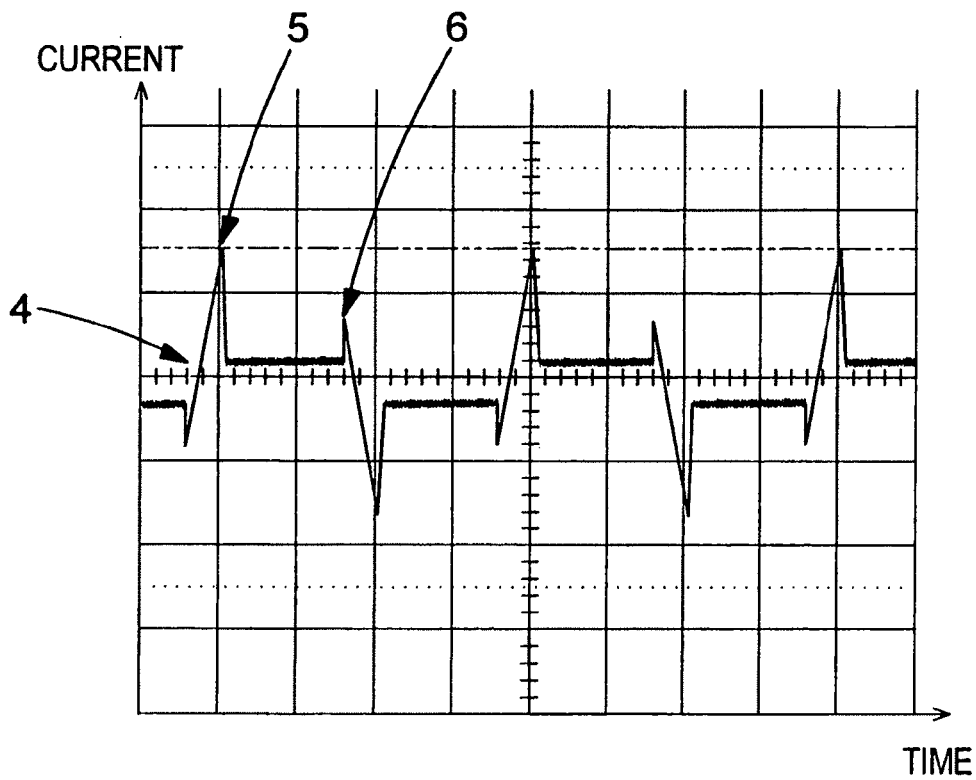
FIG. 5 is a table showing relevant values of components shown in FIG. 4.
FIG. 6 is a graph showing the current flowing in the variable load circuit of FIG. 4 when an undimmed AC voltage is applied to it.

FIG. 5 is a table showing values of various components shown in FIG. 4. Values are shown in the right hand column for components of a variable load circuit 2 for use with a 240 Volt applied signal as described above. Values are also shown for use when a 120 Volt signal is to be applied to a variable load circuit.

Figure 7:
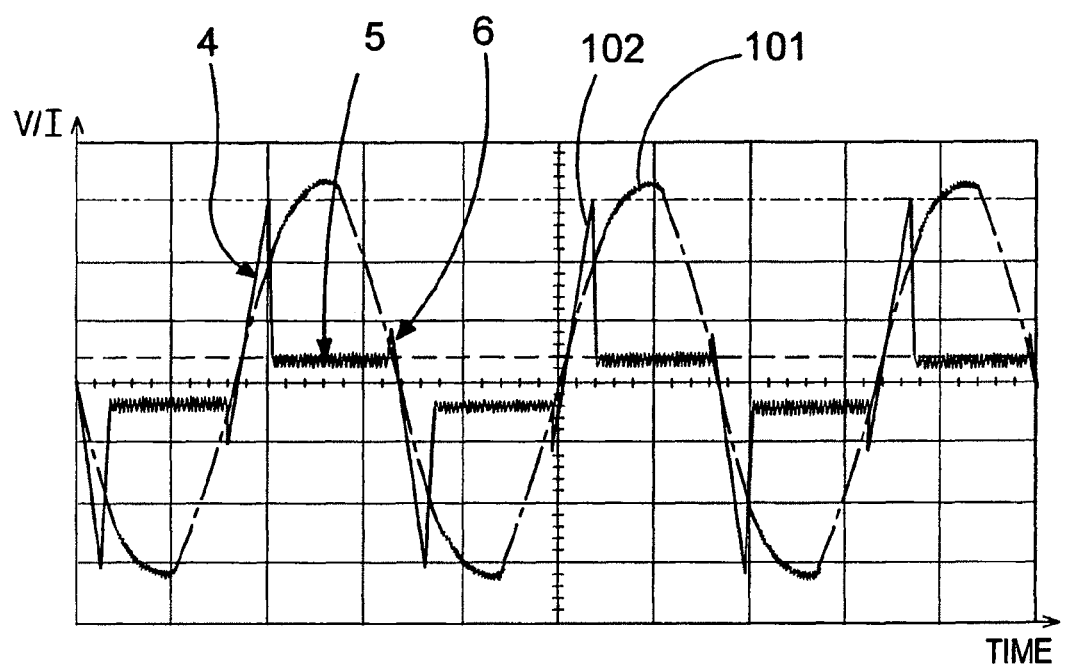
FIG. 7 is a graph showing a plot of an undimmed AC voltage, applied to the variable load circuit of FIG. 4, overlaid with a plot of the current flowing in the variable load circuit.

FIG. 6 shows a plot of the current through the variable load circuit 2 when an undimmed AC voltage is applied to it. FIG. 7 shows a plot of the voltage 101 applied to the variable load circuit 2, overlaid with a plot of the current 102 through the variable load circuit 2. The applied voltage 101 is an undimmed AC voltage. With reference FIGS. 6 and 7 it can be seen that during a first portion 4 of each half cycle of the input signal the variable load circuit 2 acts as a fixed resistive load. During this period the current increases approximately linearly in response to rising applied voltage. During a second portion 5 of the half cycle, following breakdown of the Zener diode Z2, the load characteristics of the variable load circuit 2 change and the variable load circuit 2 acts as a constant current sink. Further, during a third portion 6 of the half cycle as the magnitude of the applied voltage reduces towards zero, the Zener diode Z2 stops conducting and the variable load circuit 2 reverts back to being a fixed resistive load circuit.

Figure 8:
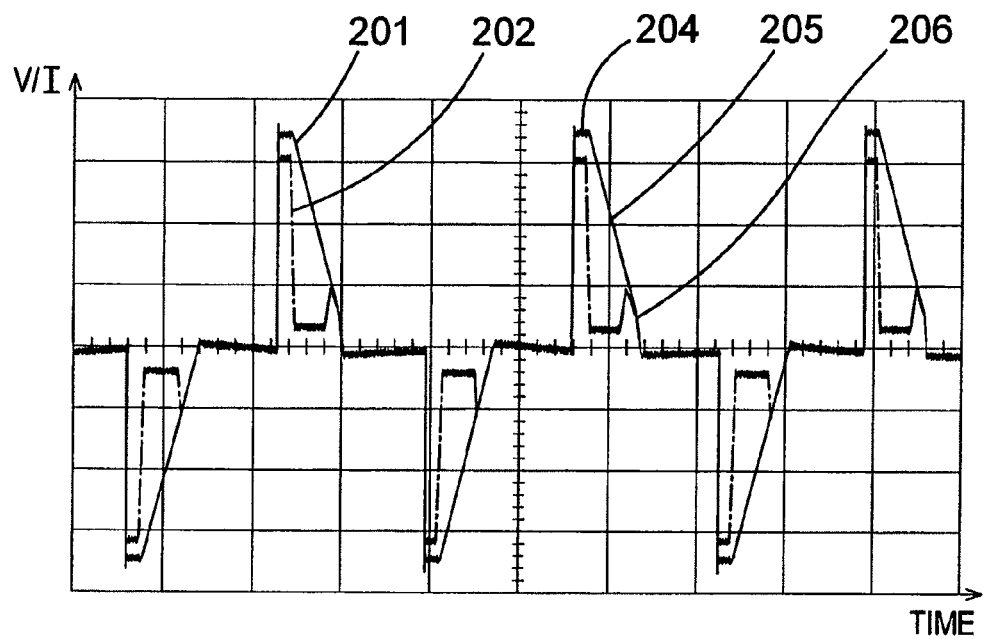
FIG. 8 is a graph showing a plot of a forward phase truncated AC voltage, applied to the variable load circuit of FIG. 4, overlaid with a plot of the current flowing in the variable load circuit.
Figure 9:
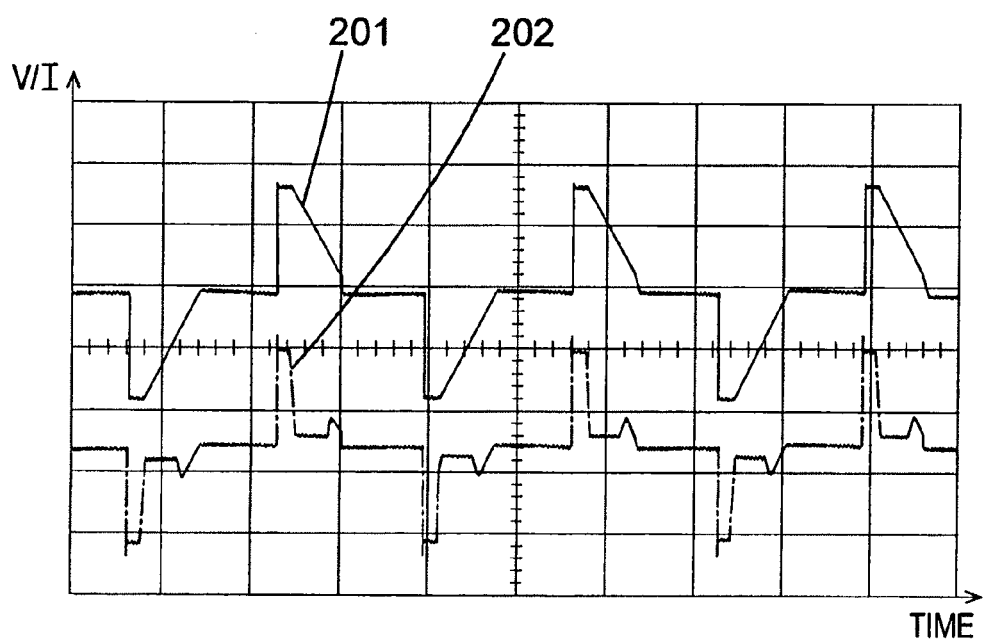
FIG. 9 is a graph showing the same plots as FIG. 8 but with the two plots separated in the vertical axis of the graph.

In the described embodiment, the forward phase two wire dimmer 1 charges during the first portion 4 of the half cycle during which current passing through the variable load circuit 2 increases sinusoidally. Following this, during the second portion 5 of the half cycle, the variable load circuit 2 acts as a constant current sink, not dissipating more power than necessary but maintaining a current flow greater than the minimum holding current of a triac in the dimmer circuit 1. FIG. 8 shows a plot of the voltage 201 applied to the variable load circuit 2, overlaid with a plot of the current 202 through the variable load circuit 2. In contrast to FIGS. 6 and 7, the applied voltage 201 is a forward phase dimmed hot signal. FIG. 9 shows the voltage plot 201 and the current plot 202 of FIG. 8, offset from each other in the vertical axis to show the plots distinctly.

It can be seen that, during a first period 204, following a step change in the applied voltage, the applied voltage 201 is high and the current 202 through the variable load circuit 2 is also high. During this short first period 104, the voltage across the Zener diode Z2 increases, slowed by the charging of capacitor C3, and the variable load circuit 2 acts as a fixed resistive load. The Zener diode Z2 breaks down once the voltage across it exceeds a threshold of approximately 5.6V, and this begins a second period of operation 205 of the variable load circuit. In the second period 205, the variable load circuit 2 acts as a constant current sink. The absolute magnitude of the applied voltage is generally decreasing during the second period 205 and the Zener diode Z2 stops conducting once the voltage across it drops below the threshold; this begins a third period of operation 206 during which the variable load circuit 2 reverts back to being a fixed resistive load circuit.

Whilst use of the variable load circuit 2 has been described with a two wire forward phase dimmer circuit, the variable load circuit may be conveniently used with other dimmer circuits. If a reverse phase two wire dimmer is connected to the variable load circuit 2, operation will occur as described above with respect to FIG. 6, except that charging will typically occur during the third portion 6 of the half cycle. Of course, if the circuit is used with dimmer circuits that need to charge in both the first and third portions of the dimmer cycle, these will work as well.

If the variable load circuit 2 is used with a FET based dimmer, then the minimum current passed during the second portion of the half cycle is unnecessary. However, the variable load circuit 2 may still be used with such dimmers and will be more efficient than simply placing a resistor or other passive load in the circuit.

Whilst an example of a fixed circuit portion, secondary load portion, trigger circuit portion, and charge storage portion have been described above, these examples should not be considered limiting. As will be apparent to the reader, similar or identical functionality may be obtained using different circuit layouts. In some embodiments the secondary load circuit portion may comprise all the components necessary to form a constant current sink. In such embodiments, the circuit may be arranged to switch between the fixed load circuit portion and the secondary load circuit portion during each half cycle of the applied alternating signal. In this way only one of the fixed load circuit portion and secondary load circuit portion is in use at any one time.

The invention claimed is:

1. A variable load circuit for use with a lighting control device, and arranged to operate with two different load characteristics during a half cycle of an applied alternating signal, the variable load circuit comprising:
   a first circuit portion responsive to the applied alternating signal for allowing current flow in response to voltage applied during a first portion of the half cycle of the applied alternating signal, and wherein during the first portion of the applied alternating signal the variable load circuit acts as a substantially fixed resistive load;
   a second circuit portion allowing the variable load circuit to act as a constant current sink during a second portion of the half cycle, and
   wherein the variable load circuit operates independently of any external load that is connected to the variable load circuit and
   wherein the variable load circuit is configured to be connected in parallel with the external load to receive the alternating signal.

2. The variable load circuit according to claim 1, wherein the variable load circuit is arranged to present different load characteristics during the first portion and a third portion of the half cycle of the applied alternating signal than during the second portion of the half cycle of the applied alternating signal.

3. The variable load circuit according to claim 1, wherein the first circuit portion comprises a fixed load circuit portion, which includes at least one resistor arranged to act as a fixed load.

4. The variable load circuit according to claim 1, wherein the second circuit portion comprises a secondary load circuit portion that is arranged to operate during the second portion of the half cycle of the applied alternating signal.

5. The variable load circuit according to claim 4, wherein the secondary load circuit portion comprises a first switch arranged to switch the secondary load circuit in and out of the variable load circuit.

6. The variable load circuit according to claim 4, wherein the first circuit portion comprises a fixed load circuit portion that includes at least one resistor arranged to act as a fixed load, wherein the fixed load circuit portion and secondary load circuit portion together act as a constant current sink during the second portion of the half cycle.

7. The variable load circuit according to claim 4, wherein the secondary load circuit portion acts as a constant current sink during the second portion of the half cycle.

8. The variable load circuit according to claim 1, wherein the first circuit portion comprises a fixed load circuit portion that comprises a transistor.

9. The variable load circuit according to claim 1, further comprising a rectifier for rectifying an AC input to the variable load circuit.

10. The variable load circuit according to claim 1, further comprising no more than two terminals for external connections.

11. The variable load circuit according to claim 1 wherein the first circuit portion is arranged to allow a greater current flow in response to voltage applied during the first portion of the half cycle than in response to voltage applied during the second portion of the half cycle.

12. The variable load circuit according to claim 1, wherein during the first portion of the half cycle, the absolute value of the voltage of the applied alternating signal is below a threshold, and during the second portion of the half cycle, the absolute value of the voltage is above the threshold.

13. A lighting control apparatus comprising:
   a variable load circuit; and
   a lighting control device connected to the variable load circuit, wherein the lighting control device is arranged to supply an alternating signal to the variable load circuit, and the variable load circuit is arranged to operate with two different load characteristics during a half cycle of the applied alternating signal,
   wherein the variable load circuit comprises a first circuit portion responsive to the applied alternating signal for permitting current to flow in response to voltage applied during a first portion of the half cycle of the applied alternating signal, wherein during the first portion of the applied alternating signal the variable load circuit acts as a substantially fixed resistive load;
   a second circuit portion that allows the variable load circuit to act as a constant current sink during a second portion of the half cycle, and
   wherein the variable load circuit operates independently of any external load that is connected to the variable load circuit and
   wherein the variable load circuit is configured to be connected in parallel with the external load to receive the alternating signal.

14. The lighting control apparatus according to claim 13, wherein the lighting control device requires a minimum current to pass for correct operation and the variable load circuit is arranged to pass at least the minimum current during the second portion of the half cycle of the applied alternating signal.

15. The lighting control apparatus according to claim 13, wherein the lighting control device is arranged to charge during the first portion of the half cycle of the applied alternating signal and the variable load circuit is arranged to pass sufficient current during the first portion of the half cycle of the applied alternating signal to allow the lighting control device to charge.

16. The lighting control apparatus according to claim 13, wherein the lighting control device is arranged in series with the variable load circuit.

17. The lighting control apparatus according to claim 13, wherein the lighting control apparatus is connectable to a light for control of the light.

18. The lighting control apparatus according to claim 17, wherein the variable load circuit is arranged in parallel with the light, when the light is connected to the lighting control apparatus.

19. A variable load circuit for use with a lighting control device, the variable load circuit being arranged to:
   operate with two different load characteristics during a half cycle of an applied alternating signal, the variable load circuit comprising:
   a first circuit portion that allows greater current flow in response to voltage applied during a first portion of the half cycle of the applied alternating signal than in response to voltage applied during a second portion of the applied alternating signal, wherein the first circuit portion allows the variable load circuit to act as a substantially fixed resistance during the first portion of the half cycle and
   further comprising a second circuit portion that allows the variable load circuit to act as a constant current sink during the second portion of the applied alternating signal, and wherein the variable load circuit operates independently of any external load connected to the variable load circuit and wherein the variable load circuit is configured to be connected in parallel with the external load to receive the alternating signal.

* * * * *